G. H. REYNOLDS,
Assignor to himself and C. H. Delamater.
HOISTING-MACHINE.
No. 7,727. Reissued June 5, 1877.
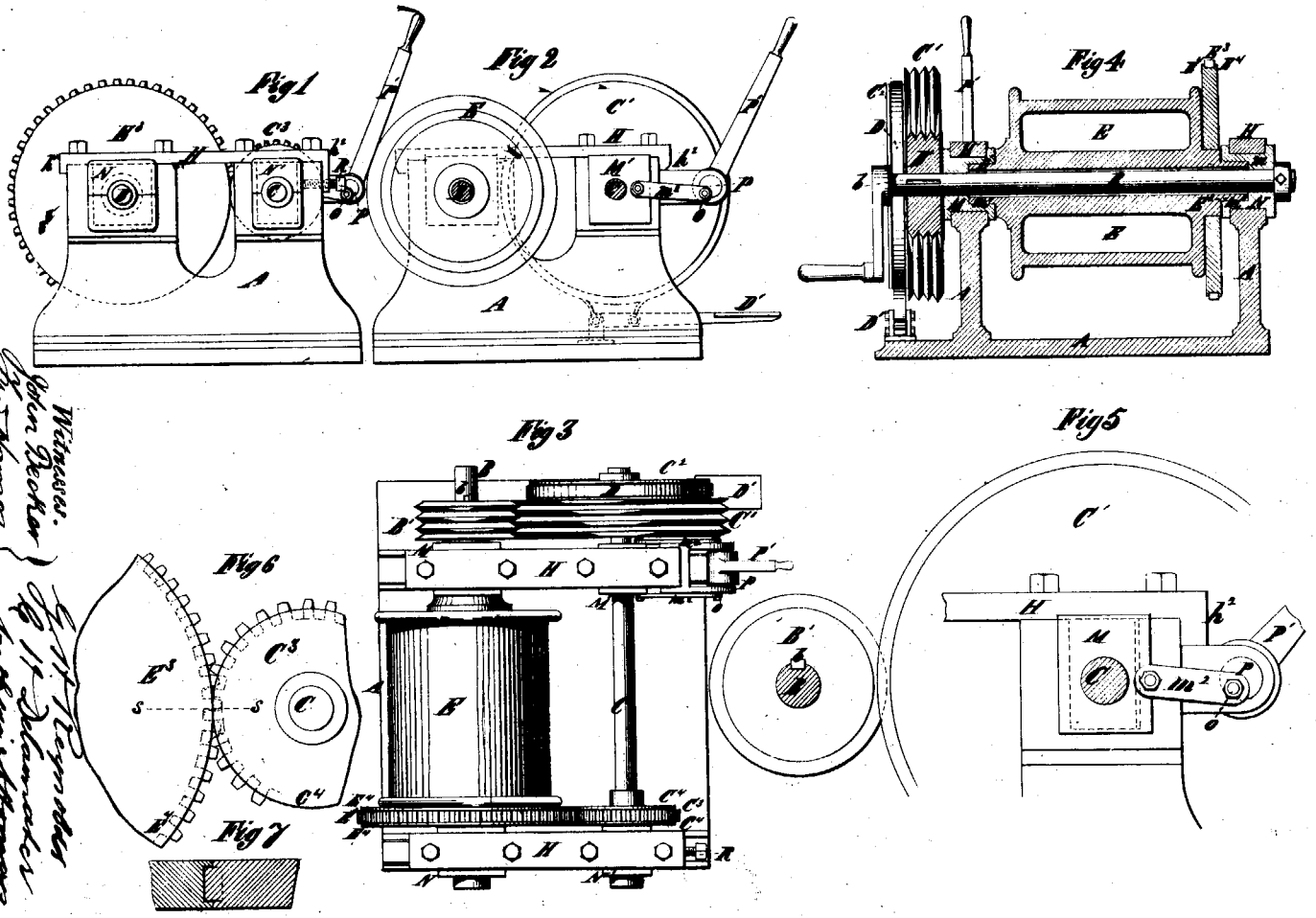
Witnesses.
John Decker
Fred Haynes
G. H. Reynolds
& H. Delamater
by their Attorneys
Brown & Allen

UNITED STATES PATENT OFFICE.

GEORGE H. REYNOLDS, OF NEW YORK, N. Y., ASSIGNOR TO HIMSELF AND CORNELIUS H. DELAMATER, OF SAME PLACE.

IMPROVEMENT IN HOISTING-MACHINES.

Specification forming part of Letters Patent No. 81,289, dated August 18, 1868; reissue No. 7,727, dated June 5, 1877; application filed February 22, 1877.

*To all whom it may concern:*

Be it known that I, GEORGE H. REYNOLDS, of the city, county, and State of New York, have invented certain new and useful Improvements in Hoisting-Machines; and I do hereby declare that the following is a full and exact description thereof.

My invention is adapted for hoisting cargoes into and out of ships, raising and lowering the material and men in mines, and in all analogous situations; but it is more especially intended for those situations where a considerable number of hoisting-machines are to be worked from a single engine—as, for example, at the shafts of mines, where the shafts are of such a size that several independent hoisting-ways are provided in the same shaft, or on a dock, where a number of hoisting-engines for loading and unloading coal, and the like, may be driven by a single line of shafting.

I will first proceed to describe what I consider the best means of carrying out my invention, and will afterward describe the points which I believe to be new therein.

The accompanying drawings form a part of this specification.

Figure 1 is a side elevation. Fig. 2 is a cross-section. Fig. 3 is a plan, and Fig. 4 is a longitudinal section. These figures show the entire machine on a small scale. Fig. 5 represents a side view of some of the parts on a larger scale, being the friction-gear and its appurtenances. Fig. 6 similarly represents another detail—the combined friction and spur gear which conveys the power from the jack-shaft to the hoisting-drum. Fig. 7 is a section of the same on the line S S in Fig. 6.

A is the fixed frame-work, made of cast-iron or other suitable material.

B is a section of a long main or driving shaft, which is rotated by a steam-engine or other power. (Not represented.) This shaft is extended, and holds the same relation to a number of hoisting-machines to be driven by it, only one being represented. A feather, *b*, communicates the rotating motion from the shaft B to the friction gear-wheel B′, the latter being free to move endwise on the shaft and feather, but being compelled to rotate with the shaft. The periphery of this friction gear-wheel B′ is finished in V-shaped grooves, as represented.

C is a counter-shaft, such as is known as a jack-shaft, and $C^1$ is a large friction gear-wheel keyed or otherwise firmly fixed thereon. The periphery of this friction gear-wheel $C^1$ is finished in grooves V-shaped to correspond with the surface of the wheel B′. The motion is transmitted from the wheel B′ to the wheel $C^1$, and this from the shaft B to the shaft C at a reduced velocity, but with an increased force.

$C^2$ is a brake-wheel fast on the jack-shaft C, by the side of the friction gear-wheel $C^1$, and adapted to receive the strap-brake D, which is mounted as represented, and adapted to be operated by the action of the foot on the treadle D′, as will be obvious.

$C^3$ is a small tooth-pinion fixed on the jack-shaft C, and meshing into the larger toothed gear-wheel $E^3$, which is fast to the drum E. There is a peculiarity in the construction of these wheels which will be described farther on. The general effect of the gearing is to transmit a slow and powerful rotatory motion to the wheel $E^3$. This drum winds up the rope or chain, or, by being allowed to turn in the opposite direction, allows the latter to unwind, according as the machine is required to hoist or lower. It will be understood that, in the act of unwinding, the brake D and its connections are used in the ordinary manner to control the rapidity of the unwinding, consequently the lowering of the weight which is suspended, but being applied to act on a brake-wheel upon the jack-shaft, instead of one attached directly to the drum or drum-shaft, its effect is increased by the tooth-pinion $C^3$ on the jack-shaft gearing into the larger tooth-wheel $E^3$ on the drum.

It will be observed that the bearings of the shafts B and C are not directly on the frame-work A, but are in boxes. I will describe these boxes separately. The boxes M N support the driving-shaft B, and also the gudgeons or trunnions of the drum E. The bearings or gudgeons of the drum E are designated $E^1$, and are hollow extensions, cast or otherwise firmly fixed on the drum, and turned at the periphery to form small and durable bearings. A hole is provided quite through the gudgeons $E^1$, also through the drum E, of a greater diameter than the shaft B, so that it allows the shaft to turn freely without contact therewith. The boxes M N are finished properly to form a suitable bearing for the gudgeons $E^1$, and also to form a suitable bearing for a smaller shaft, B. This is effected by making the bearings each with an offset, as represented, one-half, or about one-half, of the width of each box M N being adapted to serve as a bearing for the shaft B, and the other one-half of the width adjacent to the ends of the drum E is finished, and adapted to form a suitable bearing for the gudgeons $E^1$. I form the lower box and the upper box alike, so that a firm and reliable bearing is provided, with proper provisions for oiling. (Not represented.) I have designated the large part of each bearing $m^1$ and the small part of each bearing $m$. The peculiar construction and arrangement in these parts make the bearings of the driving-shaft B entirely independent of the bearings of the drum D. It frequently happens, where machines are worked in this manner, that one hoisting machine lies idle for a long period, sometimes for an entire season, while the shafting which is ready to drive it is actively rotating and giving motion to the others. Now, if, as is usually the case, the driving-shaft B were used for the support of the drum E and its connections, the wear thus induced, being all on one side of the drum E, would induce serious damage, and, perhaps, quite incapacitate the machine for subsequent work.

As I have arranged it the wear is entirely independent of the drum E. No contact of the shaft B with the interior of the drum E can occur until the box M is gradually worn away. Very ordinary care on the part of the engineer in charge is sufficient to guard against the driving-shaft getting so much out of line as to touch and wear upon the interior of the drum E, and even supposing that it does so wear, the subsequent "lining-up" of the shaft by introducing new boxes M N remedies the evil entirely, and the fact that the interior of the drum E is worn a little out of true on one side is of no effect whatever in the subsequent working of the machine.

The boxes M′ N′ support the jack-shaft C. Both move horizontally within certain limits. The box nearest to the wheel $C^1$ is connected by links $m^2$ to pins O, mounted eccentrically in the shaft P, which turns in suitable fixed bearings attached to the frame A. By turning this shaft P by aid of the hand-lever P′ the box N′ may be moved horizontally. It is thus moved away from the driving-shaft B, carrying with it the jack-shaft C and friction-wheel $C^1$, when it is desired to suspend the hoisting motion, and is moved toward the driving-shaft B, carrying with it the jack-shaft C, so as to press the surfaces of the friction-pulley $C^1$ into contact with the surfaces of the friction-pulley B′, whenever it is desired to hoist.

The pins O are mounted in such a position on the shaft P, and all the parts are so adjusted, that the radius of motion of the pins O acts nearly in line with the links $m^2$ when the friction-wheels B′ $C^1$ are properly in contact, so that there is a great leverage to allow these parts to be forcibly brought together by the action of the hand on the lever P′. I attach considerable importance to this arrangement.

The other box, N′—that nearest the gear-wheel $C^3$—is adapted to be adjusted horizontally by means of the screw R. This screw allows the gear-wheels $C^3$ and $E^3$ to be adjusted with very great delicacy.

I will now describe the construction and the peculiar operation of this gear as thus delicately adjusted.

The teeth of each of the wheels $C^3$ and $E^3$ are cast or otherwise produced of the ordinary approved forms for matching accurately together, and transmit the motion smoothly from one wheel to the other. The service which is required of these wheels is peculiarly severe. In the act of hoisting, a rotatory motion is transmitted slowly from the wheel $C^3$ to the wheel $E^3$. In the act of holding the weights suspended, the teeth, which are in contact, stand at rest or support the strain in the ordinary manner.

So far the work is not peculiarly severe; but in the act of lowering the load by slackening the strain on the brake D the rope is liable to unwind from the drum E with very great rapidity, and a motion in the reverse direction of that of winding up or hoisting is transmitted from the large gear-wheel $E^3$ to the small gear-wheel $C^3$. The wear in this case is on the opposite faces of the teeth from that experienced in hoisting; and it is very difficult in practice to avoid a disagreeable and dangerous backlash in the gear. This is particularly severe when, after attaining a very high speed, the brake D is applied with violence and again let off or slackened up suddenly, as is liable to be done. The noise and liability to fracture which would otherwise result from this peculiar service are entirely obviated by my construction and arrangement of these parts. I provide on each of the gear-wheels $C^3$ $E^3$ a stout rim on each side of the teeth, which is accurately turned to the pitch-line of the gear. I turn the screw R until the bearings thus provided are pressed firmly together, so that there is a rolling contact between the surfaces $C^4$ and $E^4$ on each side of the gear $C^3$ and $E^3$. The rims $C^4$ and $E^4$ are cast in one with the teeth $C^3$ and $E^3$, and perform the double functions of strengthening the teeth and of steadying the motion of the gear. I press the wearing-surfaces in contact firmly, so as to induce a slight resistance to motion, and find that the result is an almost noiseless motion of the gear, both in hoisting and in lowering.

I have tested the invention, and find that it greatly reduces the liability of the parts to fracture. I wish it distinctly understood that I ascribe this fact not alone to the strengthening of the teeth by their connection at the roots, but also to the steadying of the motion and the prevention of concussive shocks and hammering of the teeth together by reason of the contact of the rolling-surface.

I aid in resisting the strain, urging the boxes M and N apart by means not only of the frame A, but also by peculiarly arranged and constructed binders H. These latter are adapted to perform the double duties of binders and of ties. Strong shoulders $h^1$ $h^2$ are provided, which fit over and support corresponding surfaces on the framing A. By mounting the bearings of the shaft P and of the screw R in the ends of these binders, instead of on the framing A, I insure a directness of strain and an absence of spring in all the parts, which is very desirable, and without which it would be difficult to properly realize the advantages due to the other advantages of my invention.

When the shaft B is short the provision for allowing the friction-pulley B′ to move endwise thereon is of little importance. But when the shaft B is long, and is employed to give motion to more than one of my hoisting-engines, it is liable, from various causes, particularly from the occasional heating of the shaft from friction, to vary the length, and thus to vary the position, of the parts firmly attached thereto, so much so as to cause serious mischief. My arrangement, in allowing the end motion, as described, has been successfully tested at the mouth of a mine where heavy loads of material are lifted by independent hoists at the rate of two hundred and fifty feet per minute by a single continuous-working engine.

By the use of friction-gearing between the jack-shaft and the drum, and providing for bringing the drum into and out of gear by moving the jack-shaft toward and from the drum, I am enabled to put the drum into and out of gear, while the driving-shaft is rotatory at the highest speeds, without any shock, and also with a very small application of manual force, as the weight of the load offers no impediment to the moving of the jack-shaft into and out of gear.

I claim—

1. The combination, with the driving-shaft and drum of a hoisting-machine, of a jack-shaft interposed between the driving-shaft and drum, and geared with the driving-shaft by V-shaped friction-gearing, and means of moving the said jack-shaft into gear with and out of gear from the jack-shaft, substantially as and for the purpose herein set forth.

2. The combination, with a hoisting-machine in which the drum is driven by a jack-shaft interposed between it and the driving-shaft, of a brake-wheel placed upon the jack-shaft, substantially as and for the purpose herein set forth.

3. In combination with the V-shaped friction gear-wheels B′ $C^1$, applied to a hoisting-machine, one of the said gear-wheels fitted to its shaft with a feather, by which it is rendered self-adjusting to the other of said wheels, substantially as herein set forth.

4. In combination with the shaft C and friction-wheels B′ $C^1$, the movable box M′, links $m^2$, and eccentric pins O, mounted relatively to the shaft P and handle $p$, so that the pins $o$ shall come nearly on their dead-points when the friction-wheels B′ $C^1$ are properly connected, as and for the purposes herein set forth.

5. The combination, with the cog-wheels $C^3$ and $E^3$, by which the jack-shaft and drum of the hoisting-machine are geared directly together, of the bearing-rims $C^4$ and $E^4$, the peripheries of which are on the pitch-lines of said wheels, substantially as and for the purpose herein set forth.

6. The combination, with the drum E, surrounding but not touching the driving-shaft, of the journal-boxes M N, each containing a larger bearing for one of the gudgeons $E^1$ of the drum, and a smaller bearing for the driving-shaft, substantially as herein described.

7. The binders H $h^1$ $h^2$, constructed and arranged to serve relatively to the shafts B C and their several connections, so as to support the frame A and aid in preventing any spring or displacement of the parts under the strains and vibrations to which they are subjected, as herein set forth.

GEO. H. REYNOLDS.

Witnesses:
HENRY T. BROWN,
BENJAMIN W. HOFFMAN.